Dec. 30, 1969  G. E. BEYER ET AL  3,486,764
RETRACTABLE STONE DEFLECTOR FOR VEHICLE
Filed Oct. 15, 1968
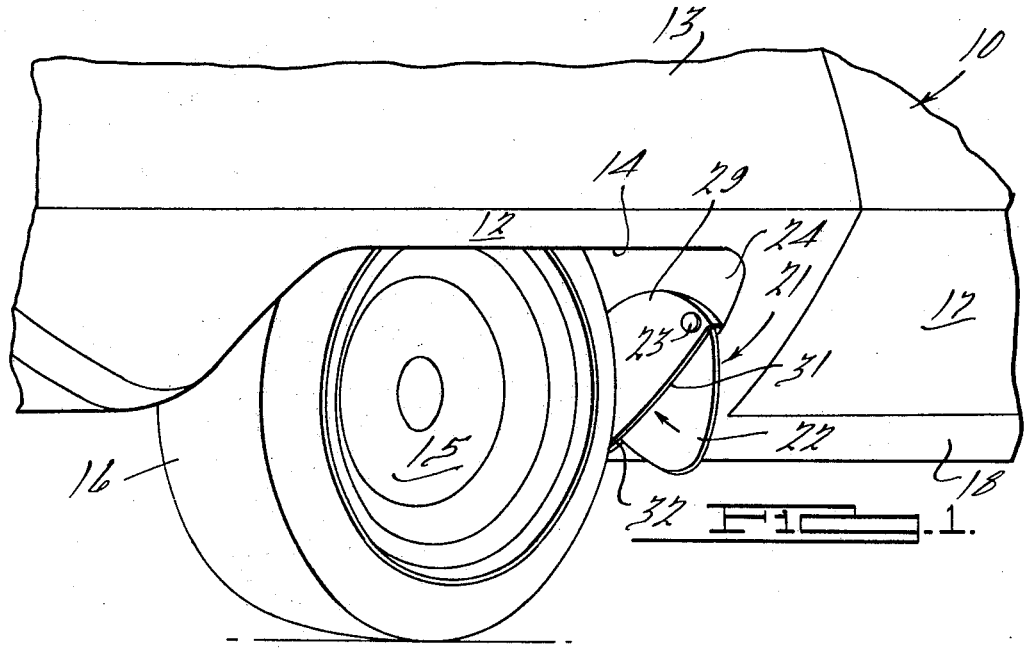
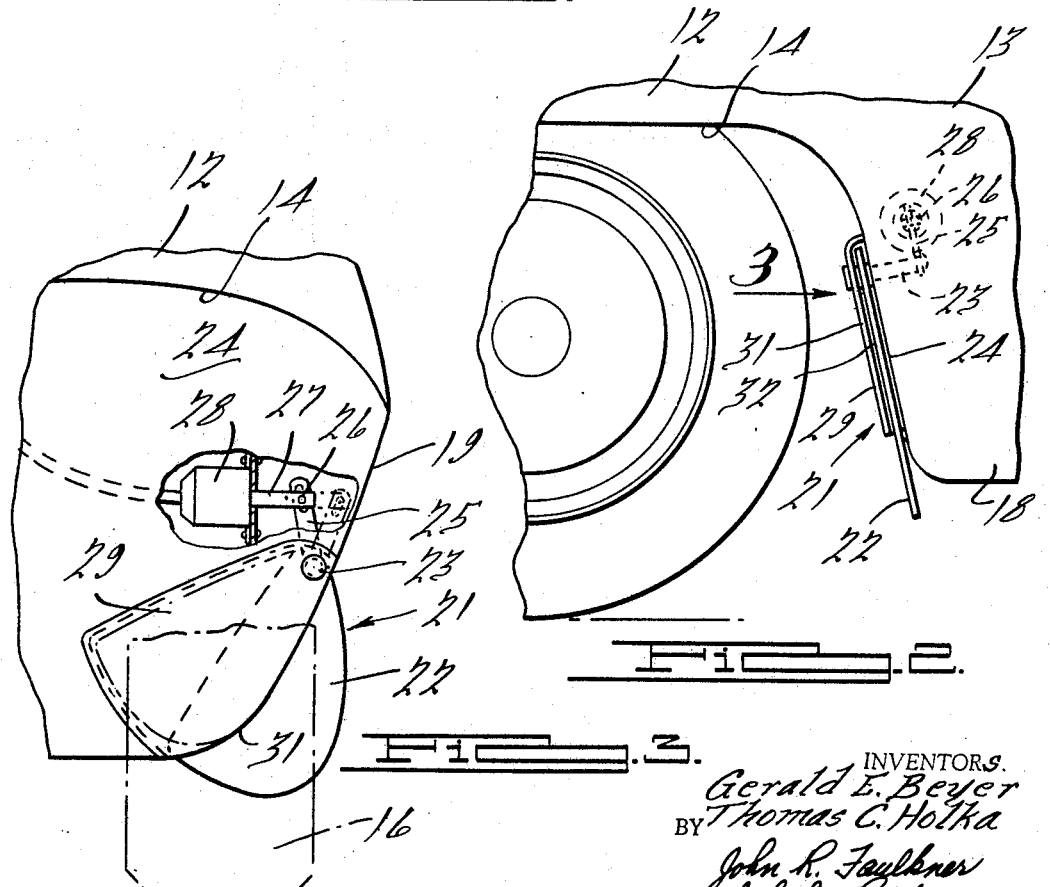
INVENTORS.
Gerald E. Beyer
BY Thomas C. Holka
John R. Faulkner
John J. Roethel
ATTORNEYS.

United States Patent Office 3,486,764
Patented Dec. 30, 1969

3,486,764
RETRACTABLE STONE DEFLECTOR FOR VEHICLE
Gerald E. Beyer, Lathrup Village, and Thomas C. Holka, Detroit, Mich., assignors to Ford Motor Company, Dearborn, Mich., a corporation of Delaware
Filed Oct. 15, 1968, Ser. No. 768,201
Int. Cl. B62b 9/16; B60d 25/16
U.S. Cl. 280—154.5   4 Claims

ABSTRACT OF THE DISCLOSURE

A laterally extensible and retractable stone deflector pivotally mounted on a rear wall of a vehicle wheel well. When pivoted into a position laterally outwardly of the vehicle wheel well, the stone deflector provides protection to the vehice body panel rearwardly of the wheel well against impingement by stones or the like kicked up from a road surface by a road wheel of the vehicle. The stone deflector is particularly useful when the road wheel has a wide tread tire a portion of which projects laterally outwardy of the lower portion of the vehicle body panel.

BACKGROUND OF THE INVENTION

The combination of extremely rounded contours on the lower body side panels of some vehicle models and the use of wide tread tires presents an undesirable maintenance problem. When viewed from a position directly in front of a road wheel, it readily may be noticed that the width of a tire conceals the lower portion of the body side panel to the rear of the wheel. This, in effect, means that the body panel is vulnerable to being splattered by mud, road oil and asphalt or tar substances and that stones, gravel or other missiles lying on the road surface can be impinged against the body panel.

The use of rubber or plastic stone deflector flaps depending from the rear wall of the vehicle wheel well are well known in the prior art. These conventional devices are relatively unsightly and cannot be hung in a position to accommodate the tread width and panel contours of many of the current models of vehicles. Accordingly, it is an object of the present invention to provide retractable stone deflectors that will overcome these deficiencies of the fixed flap type deflectors.

SUMMARY OF THE INVENTION

The present invention relates to a stone deflector assembly on a wheel well panel of a vehicle rearwardly of a road wheel. The stone deflector assembly is particularly adapted for vehicles having highly contoured lower body side panels and wide tread tires, or tires which at least in width project outwardly of the lower portion of the body panel rearwardly of the wheel well. The deflector assembly comprises a deflector panel pivotally supported on the wheel well rear panel or wall. An operating means, preferably one responsive to energization of the vehicle propulsion system, is coupled to the deflector panel for pivotally moving the latter to and from retracted and extended positions.

As an additional feature, a housing member is provided to conceal the deflector panel in the retracted position of the latter.

DESCRIPTION OF THE DRAWING

Other objects, advantages and features of the present invention will be made more apparent as this description proceeds, reference being had to the accompanying drawing wherein:

FIG. 1 is a fragmentary perspective view of the lower portion of a vehicle illustrating the relationship of the stone deflector assembly embodying the present invention to a road wheel and the portion of a body panel to be protected;

FIG. 2 is a side elevation of FIG. 1; and

FIG. 3 is a view in the direction of the arrow 3 in FIG. 2.

DETAILED DESCRIPTION OF THE INVENTION

Referring now to the drawing, FIG. 1 illustrates the front corner of a vehicle body, generally designated 11. A portion 12 of the front fender or front quarter panel 13 has a wheel well 14 in which is housed a wheel 15. The wheel 15 is shown as having a wide tread tire 16. Rearwardly of the front quarter panel 13 is a vehicle door 17 above a rocker panel 18.

As best seen in FIG. 3, the contour of the outer skin of the quarter panel 13, the door 17 and the rocker panel 18 has an abrupt curvature downwardly and inwardly of the vehicle body, as at 19. The outer skin 19, in effect, cuts across the rearwardly projected width of the tire 16. This condition is particularly noticeable with the wide tread tires currently in vogue. As a result the lower corner of the vehicle body shown in FIG. 1 readily accumulates mud, road oil and asphalt or tar splatters. This area is also highly vulnerable to a condition known as "stone pecking," that is, the chipping, nicking or pitting of the paint surfaces by stone, gravel or other missiles picked up from the road urface and hurled rearwardly by the road wheel.

To protect this vulnerable area of the vehicle body, there is provided a stone deflector assembly, generally designated 21. It will be understood that this assembly can be duplicated for each road wheel, although the body area behind each front wheel is most in need of protection.

The stone deflector assembly 21 comprises a substantially paddle shaped deflector panel 22 which is pivotally supported on one or the outer end of a pivot shaft 23 projecting through the rear wall or panel 24 of the wheel well 14. Keyed to the other or inner end of the pivot shaft 23 is a lever arm 25 which is coupled at 26 to an actuator rod 27 of an operating means 28. This operating means may be a vacuum motor, a hydraulic cylinder, a solenoid or nothing more than one end of a push-pull cable operable from the instrument panel area of the vehicle passenger compartment. If the operating means is a power device, such as a vacuum motor, hydraulic cylinder or solenoid, energization of the operating means may be tied in with energization of the vehicle propulsion system. For example, the vacuum motor would sense engine vacuum so that when the engine is operating at a speed sufficient to propel the vehicle the stone deflector assembly 21 would be in operative or vehicle body protecting position. At engine cut-off, or perhaps even an engine idle speed, the stone assembly would be moved to a retracted or inoperative position. Likewise, the hydraulic motor would be coupled to the output of an oil pump or the like so as to be responsive to oil pressure caused by operation of the vehicle engine or transmission. The solenoid could be tied into the vehicle ignition electrical system so that when the latter is energized the solenoid would be energized to move the deflector panel from retracted to extended position.

In retracted position, the stone deflector panel 22 is concealed within a housing member 29 mounted on the front face of the wheel well wall 24. At its side edge 31, the housing member 29 has an opening 32 through which the deflector panel 22 is extensible. The housing member edge 31 is contoured to conform substantially to the contour of the quarter panel 13—rocker panel 18 area of the vehicle body.

It is to be understood that this invention is not limited to the exact construction illustrated and described above, but that various changes and modifications may be made without departing from the spirit and scope of the invention.

We claim:
1. A stone deflector assembly mounted on a wheel well panel rearwardly of a road wheel, comprising:
   a deflector panel,
   pivot means supporting said deflector panel on the wheel well panel,
   a housing member secured to the wheel well panel concealing said deflector panel in a retracted position of the latter,
   said housing member having at one edge thereof an opening through which the deflector panel is extensible,
   said housing member edge being contoured to conform substantially to the contour of a rearwardly extending side panel of the vehicle,
   said deflector panel being extensible beyond the vehicle side panel to protect the latter from missiles projected by the road wheel,
   and operating means coupled to said deflector panel for pivotally moving the latter to and from retracted and extensible positions.

2. In a motor vehicle having a wide tread road wheel,
   a wheel well having a wall rearwardly of said road wheel,
   a vehicle body panel extending rearwardly of said wheel well and having a curvature extending downwardly and inwardly of the vehicle body so as to angularly extend across the tread width of said road wheel,
   a deflector panel pivotally mounted on said wheel well wall for movement to and from retracted and extended positions,
   a deflector housing member secured to the wheel well wall concealing said deflector panel in a retracted position of the latter,
   said deflector housing member having at one edge thereof an opening through which the deflector panel is laterally extensible,
   said deflector panel being laterally extensible beyond the vehicle body panel across the tread width of the road wheel to protect the body panel from missiles projected by the road wheel,
   and actuating means coupled to said deflector panel for pivotally moving the latter to and from retracted and extended positions.

3. In a motor vehicle according to claim 2, in which the actuating means is a power operated means.

4. In a motor vehicle according to claim 3, in which the power operated means pivotally moves the deflector panel to extended position in response to energization of the vehicle propulsion system.

References Cited

UNITED STATES PATENTS

| | | | |
|---|---|---|---|
| 2,585,397 | 2/1952 | McCollum | 280—154.5 |
| 3,248,126 | 4/1966 | Saxton | 280—154.5 |

LEO FRIAGLIA, Primary Examiner

R. R. SONG, Assistant Examiner